United States Patent [19]

Schreiber-Prillwitz et al.

[11] Patent Number: 5,532,187

[45] Date of Patent: Jul. 2, 1996

[54] PROCESS FOR SEALING APERTURES IN GLASS-SILICON-GLASS MICROMECHANICAL ACCELERATION SENSORS

[75] Inventors: Wolfgang Schreiber-Prillwitz; Horst Plankenhorn, both of Villingen-Schwenningen, Germany

[73] Assignee: VDO Kienzle GmbH, Villingen-Schwenningen, Germany

[21] Appl. No.: 357,801

[22] Filed: Dec. 16, 1994

[30] Foreign Application Priority Data

Dec. 16, 1993 [DE] Germany ............................ 43 42 890.8

[51] Int. Cl.⁶ ............................ H01L 21/48; H01L 21/52; H01L 21/54; H01L 21/60
[52] U.S. Cl. ...................... 437/182; 437/219; 437/213; 437/915; 437/919; 437/927
[58] Field of Search .................................... 437/182, 213, 437/915, 919, 927, 219; 257/419; 73/514, 32

[56] References Cited

U.S. PATENT DOCUMENTS

| | | | |
|---|---|---|---|
| 4,435,737 | 3/1984 | Colton | 361/280 |
| 4,855,544 | 8/1989 | Glenn | 200/61.45 |
| 5,273,939 | 12/1993 | Becker et al. | 437/209 |
| 5,350,189 | 9/1994 | Tsuchitani et al. | 280/728 R |
| 5,392,650 | 2/1928 | O'Brien et al. | 73/517 A |
| 5,434,602 | 9/1994 | Plankenhorn | 29/24.41 |

*Primary Examiner*—George Fourson
*Assistant Examiner*—David E. Graybill
*Attorney, Agent, or Firm*—Anderson Kill Olick & Oshinsky

[57] ABSTRACT

A method for sealing apertures caused by manufacturing processes in micromechanical acceleration sensors is disclosed whereby apertures or recesses, serving for leading the conductor paths out of the oscillation space of an acceleration sensor without causing short circuits, can be sealed in a gas-tight manner in a simple way. The conductor paths establish the conducting connection between junction contacts of the acceleration sensor accessible from the outside with electrodes which are allocated on both sides to the oscillating mass of the acceleration sensor which is also configured as an electrode. The method provides to use an adhesive, which is curable or hardenable by means of light, and in particular, ultraviolet light. A specific quantity of the adhesive is applied at a certain point of the acceleration sensor and, after an experimentally determined distribution time period has elapsed, after which the adhesive has also penetrated into the recesses under the influence of capillary effect and has sealed same, is hardened or cured by exposure to light. The sealing process occurs in a nitrogen atmosphere. Prior to the above, the oscillation space was evacuated.

4 Claims, 2 Drawing Sheets

PROCESS FOR SEALING APERTURES IN GLASS-SILICON-GLASS MICROMECHANICAL ACCELERATION SENSORS

FIELD OF THE INVENTION

The invention deals with a method for sealing apertures caused by fabrication in micromechanical acceleration sensors, which are fabricated as differential capacitances in the form of a glass-silicon-glass layered package or wafer, wherein counter electrodes on the inner faces of the glass layers are allocated to the oscillating mass of a flexural resonator structured out of the silicon layer doped so as to be electrically conductive. The counter electrodes are connected so as to conduct electricity by means of equiplanar conductor paths with junction contacts located outside the oscillation space. Therein, apertures or relatively shallow recesses are worked into the silicon layer surrounding the oscillation space, which apertures serve for leading the conductor paths out of the oscillation space without causing short circuits.

BACKGROUND OF THE INVENTION

In micromechanical acceleration sensors, the acceleration measurement, as a rule, is based on a capacitive distance measurement between the fixed electrodes and the mobile electrode, meaning, the oscillating mass of the flexural resonator. The measurement principle is characterized, as is well known, by a high sensitivity, wherein temperature-caused measuring errors can be eliminated by inherent-compensation or self-compensation through the use of the differential measuring process and a satisfactory linearity is achieved.

The capacitance changes which depend upon the measured value are, however, very small, equally as are the gaps between the oscillating mass in the flexural resonator and the fixed electrodes, which lie in the range of a hundredth of a millimeter. Therefore, if acceleration sensors of the generic type which have an architecture which facilitates fabrication in large series, wherein the oscillating space is in connection with the outer atmosphere through recesses, are used without any protection, in particular, such as in a motor vehicle environment, then there exists the danger, due to contamination of the oscillation space, above all however through dew deposition, meaning, because of condensed or frozen moisture, of not only an impairment of the measuring accuracy, but rather also, a total failure of the acceleration sensor.

Accordingly, it is known to attach the generic acceleration sensor on a suitable carrier element together with means for a signal editing circuit and to hermetically encapsulate same in preferably a metal capsule, wherein the metal capsule is welded to the carrier in a protective gas atmosphere. This indeed creates a generator element, which can be handled and marketed without any problems, however, the fabrication effort required for this is considerable due to the manufacture of a special housing and its connecting technology, as well as, due to the insulated embedding of contact pins into the carrier and their establishing contact with the sensor or the signal editing circuit. The sealing of the acceleration sensor accomplished in this manner requires thus a plurality of fabrication steps, which fabrication steps are characterized by processes which are no longer justified in the fabrication of the sensor. Apart from that, a relatively long welding seam has to be hermetically tight and requires that there be provided, at the installation site, meaning, on a circuit board of an apparatus, the space required for the relatively large area generator element as well as assuring the contact connections.

SUMMARY OF THE INVENTION

The task of the present invention consists in sealing a generic acceleration sensor with as little effort or expense as possible, as well as, by measures which can be used in fabrication of large series.

The present invention is directed to a method for sealing apertures in micromechanical acceleration sensors which are caused during manufacture. The sensors are fabricated as differential capacitances in the form of a glass-silicon-glass layered package. The counter electrodes on the inner faces of the glass layers are allocated to the oscillating mass of a flexural resonator structured out of a silicon layer doped so as to be electrically conductive.

The counter electrodes are electrically conductively connected by means of equiplanar conductor paths with junction contacts located outside the oscillation space. Apertures or relatively shallow recesses are worked into the silicon layer surrounding the oscillation space. The apertures serve for leading the conductor path out of the oscillation space without causing short circuits. An adhesive or bonding agent, which can be cured or hardened by light, is used for sealing the recesses. A defined quantity of adhesive is applied at a specific point of the acceleration sensor while using the adhesive migration or creep caused by capillary forces. After an experimentally determined distribution time period has elapsed, the adhesive is cured or hardened by exposure to light.

In another embodiment of the present invention, the method is further characterized in that the sealing process is performed in a protective gas atmosphere and that the oscillation space of the acceleration sensor is evacuated prior to sealing same.

The solution of the present invention is distinguished especially by sealing an acceleration sensor, as described above, which is produced with a minimum of processing effort without additional constructional measures. This avoids the effort and expense connected with encapsulation and enables the direct placing of the acceleration sensor upon a printed circuit board which can be inserted into an apparatus.

Further, the knowledge of using a bonding agent or adhesive, curable or hardenable by ultraviolet light, as sealing material is of decisive importance. Herein, on the one hand, a typical property of adhesive being a good wetting of the materials used for the acceleration sensor which favors an automatic distribution of adhesive and the sealing of the recesses due to capillary action, is made use of, and on the other hand, the distribution process can be stopped in a comparatively short time by exposure of the adhesive to light.

Further, it is advantageous that the sealing of the acceleration sensors can be incorporated into their manufacturing process by subjecting these acceleration sensors, directly after their separation, to an evacuation process and subsequently storing them in a nitrogen atmosphere in a suitable device and then feeding them to an adhesive dispenser or a bonding-agent dispenser. After a defined quantity of adhesive has been applied, for instance 0.5 mm$^3$, and after an experimentally determined distribution period of the adhesive, of for instance 2 minutes, has elapsed, the region wetted by the adhesive is exposed to light for approximately 5 seconds. During the distribution period of the adhesive, which can be controlled within certain limits by the process temperature, the acceleration sensors are advantageously retained in the appropriately constructed magazine or storage space, which can be continuously moved forward at the timing of the adhesive application.

Accordingly, it is an object of the present invention to provide a method for sealing apertures due to manufacturing in micromechanical acceleration sensors which provides for sealing an acceleration sensor, as described above, which is produced with a minimum of processing effort without additional constructional measures.

It is another object of the present invention to provide a method which avoids the effort and expense connected with encapsulation and enables the direct placing of the acceleration sensor upon a printed circuit board which can be inserted into an aparatus.

It is another object of the present invention to provide a method which utilizes a bonding agent or adhesive curable or hardenable by ultraviolet light as a sealing material.

It is yet another object of the present invention to provide a method which provides for an automatic distribution of adhesive and the sealing of recesses.

It is yet another object of the present invention to provide a method which provides for a stopping of the adhesive distribution process in a comparatively short time by exposure of the adhesive to light.

It is still another object of the present invention to provide a method whereby the sealing of the acceleration sensors can be incorporated into their manufacturing process.

Other objects and advantages of the present invention will be made apparent to those persons skilled in the art upon a review of the Description of the Preferred Embodiment taken in conjunction with the Drawings which follow.

DESCRIPTION OF THE PREFERRED EMBODIMENT

Figure 3:
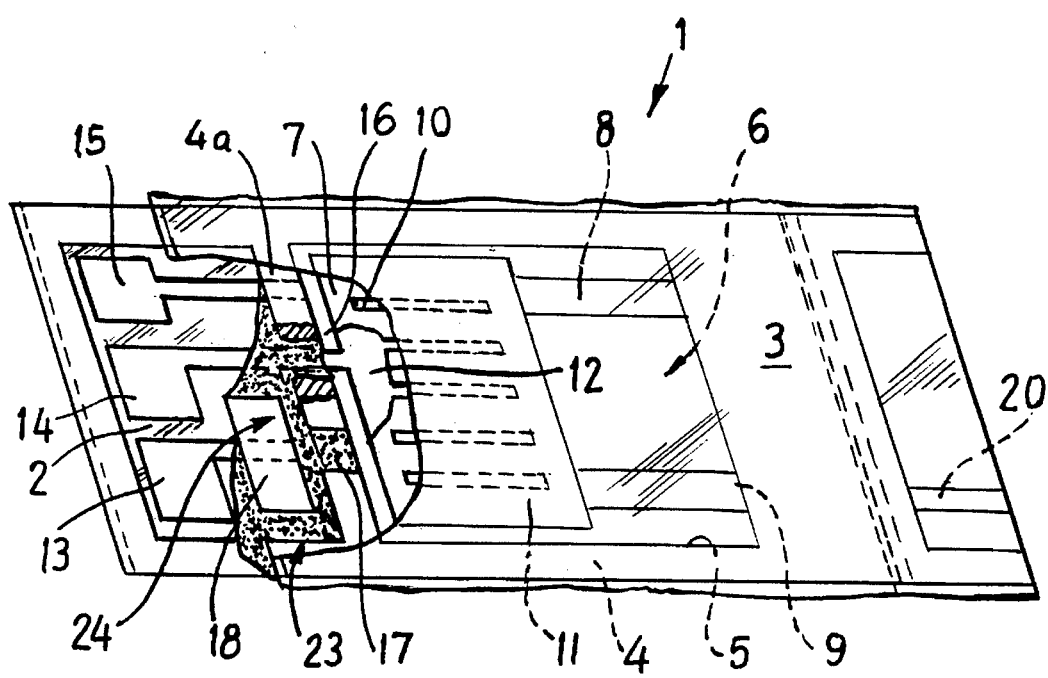
FIG. 3 illustrates a plan view of the acceleration sensor where the covering glass plate and the oscillating mass are in part broken out or shown exposed.

As an introduction, the structuring of an acceleration sensor 1 is described in the following manner. The rhombic contours of the acceleration sensor 1 which can be seen particularly well in FIG. 3 show that a 110-oriented silicon disc has been used for the manufacture of the acceleration sensor or a plurality of same acceleration sensors. This permits the utilization of the advantages of anisotropic etching technology, namely, considerably faster etching at 90° to the face of the layer. For reasons of completeness, it is important to note that, for separation of the acceleration sensors from a bonded glass-silicon-glass layer package, rated break points are created by suitable crosswise incisions, and subsequently, the layered package is broken up by pressing it, for instance, against an elastic support or backup.

Figure 1:
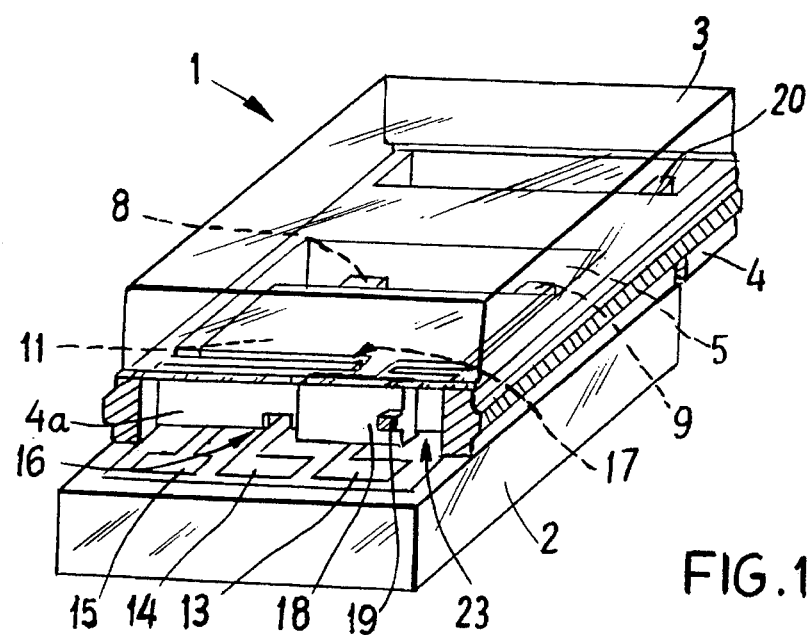
FIG. 1 illustrates a perspective view of the acceleration sensor of the generic type after the separation from a glass-silicon-glass layer package.

The break areas are shown shaded in the acceleration sensor 1 which is shown in FIG. 1. Plates of pyrex glass are designated with the numerals 2 and 3 which are bonded to a frame 4 of silicon. The glass plates 2 and 3 cover an oscillation space 5 structured out previously from the then closed silicon layer as well as covering an acceleration sensitive flexural resonator 6, whose oscillating mass is connected to the frame 4 through flexurally designed arms 8 and 9.

Slots, which are placed in the oscillating mass 7 of which one is designated by the numeral 10, serve for optimizing the frequency behavior of the flexural resonator with the aim of an approximately aperiodic or untuned damping and, thus, a shortening of the response time. At the inner faces of the glass plates 2 and 3, counter electrodes 11 and 12 are allocated congruently to the oscillating mass 7 which serves as a mobile electrode, since the silicon layer is doped so as to be able to conduct electricity. These counter electrodes consist preferably of aluminum and are attached by sputtering.

The electrical connection of the counter electrodes 11 and 12 with the junction contacts 13 and 14 of the acceleration sensor accessible from the outside is achieved by conductor paths (not shown) attached in an equiplanar manner to the counter electrodes 11 and 12 or the junction contacts 13 and 14. A third junction contact 15 connected with one conductor path or copper track serves for contacting the frame 4 and, thus, the oscillating mass 7. Herein, the conductive connection between the conductor path assigned to the junction contact 15 and the leg 4a of the frame 4 occurs by pressure bonded encapsulation during the bonding process of the glass-silicon-glass layered package.

Further, recesses 16 and 17 which are allocated to the conductor paths of the counter electrodes 11 and 12 are configured in the leg 4a of the frame 4, at which recesses form an electrical connection which is not subject to short circuits between junction contacts 13 and 14 and the electrodes 11 and 12. Herein, one of these connections must be redirected from one glass plate 3 to the other glass plate 2, which is achieved by means of a silicon block 18.

The mechanical connection of the silicon block 18 with the frame 4 is severed during separation of the glass-silicon-glass layered package and, thus, the silicon block 18 is also electrically insulated or exposed as a conductor path element between the plane of the junction contact 13 and the counter electrode 11 located on the glass plate 3. The portions of the mechanical connection between, on the one hand, a silicon block, and on the other hand, a frame of adjacent acceleration sensors, which remain standing are designated by the numerals 19 and 20.

Figure 2:
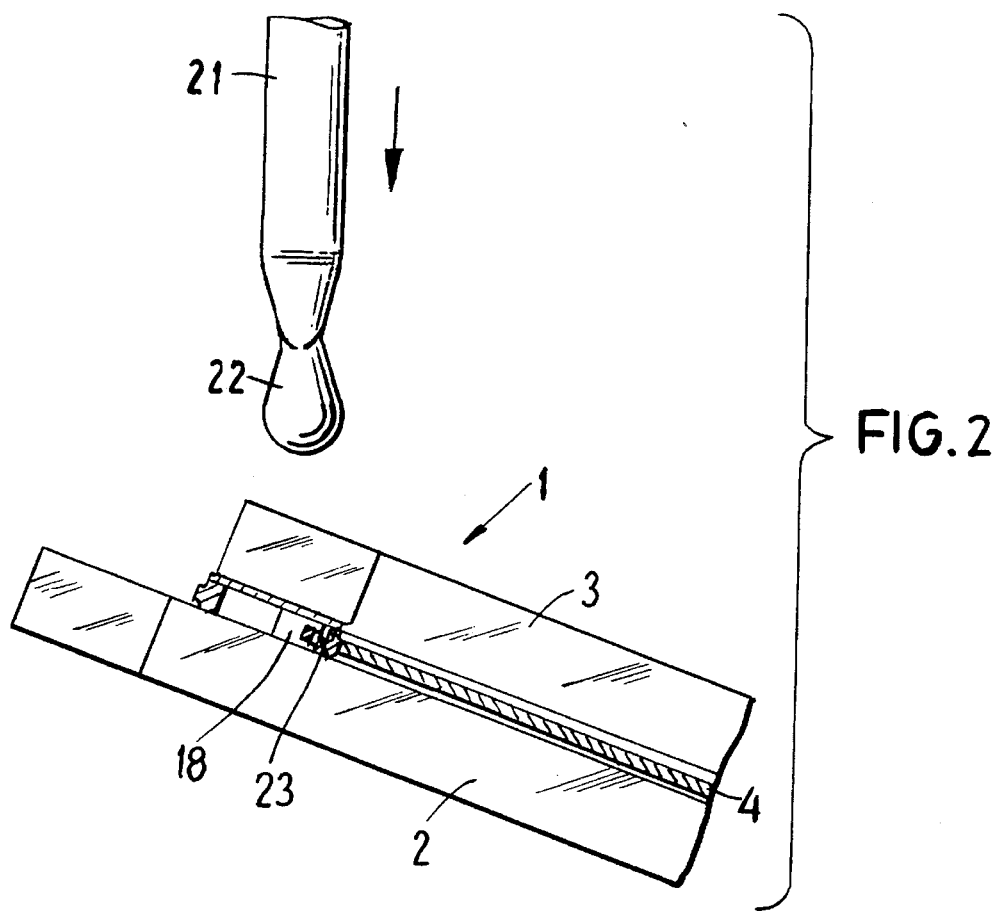
FIG. 2 illustrates a side view of the acceleration sensor shown in FIG. 1 at the moment of supply with adhesive.

The adhesive or bonding agent provided for sealing the recesses 16 and 17 is supplied by a suitable dispenser as FIG. 2 shows, wherein the advantageous working position for the sealing process between the acceleration sensor 1 and the dispenser 21, shown in FIG. 2, is predetermined by a device (not shown). A drop of adhesive, designated by the numeral 22 forms at the tip of the dispenser corresponding to the immersion depth of the dispenser into a storage container and is a function of its viscosity. The required quantity of adhesive has been experimentally determined to be of the order of magnitude of 0.5 mm$^3$.

The adhesive drop 22 is placed at a specific point of the acceleration sensor 1 and, preferably, in a spot where a gap 23, which is readily accessible from the outside, is formed between the silicon block 18 and the frame 4. In view of the increased capillary effect caused by the gap 23 and the gap 24 present between the silicon block 18 and the leg 4a of the frame 4, the adhesive drop 22 is relatively rapidly distributed in the direction of the recesses 16 and 17. In other words, the adhesive is pulled into the gaps 23 and 24. This permits the adhesive to arrive at the recesses 16 and 17 to be sealed with only a slight time stagger.

In view of the small height of the recesses 16 and 17, the distribution velocity in the recesses is slowed down so that they are sealed approximately simultaneously. When a distribution stage of the adhesive, according to FIG. 3, is attained, the adhesive is prevented from flowing further, meaning, penetration into the oscillation space 5 is impaired, by irradiating it with ultraviolet light and thus hardening same.

As indicated above, the space where the sealing of the acceleration sensors occurs is to be evacuated and then flooded with dry nitrogen. Only in this way can it be guaranteed that the oscillation space of an acceleration sensor has been filled with protective gas within a relatively short time prior to being sealed. Naturally, the adhesive used cannot be allowed to absorb any water since otherwise moisture would diffuse through the adhesive and into the oscillation space.

While the present invention has been described and illustrated in a preferred embodiment, such is merely illustrative of the present invention and is not to be construed as a limitation thereof. Accordingly, the present invention includes all modifications, variations and/or alternate embodiments with the scope of the present invention limited only by the claims which follow.

What is claimed is:

1. A method for sealing apertures in a micromechanical acceleration sensor caused during manufacture, which sensors are fabricated as differential capacitances in the form of a glass-silicon-glass layered package, which comprises the steps of:

allocating counter electrodes on the inner faces of the glass layers to the oscillating mass of a flexural resonator structured out of a silicon layer doped so as to be electrically conductive, wherein said counter electrodes are electrically conductively connected by means of equiplanar conductor paths with junction contacts located outside the oscillation space;

forming recesses into the silicon layer surrounding the oscillation space, wherein said recesses serve for leading the conductor paths out of the oscillation space without causing short circuits;

sealing the recesses by applying a quantity of adhesive, which can be cured by light and which is applied at a point of the acceleration sensor, wherein adhesive migration is caused by capillary forces; and curing said adhesive by exposure to light after a distribution time period has elapsed.

2. The method of claim 1, wherein said sealing step is performed in a protective gas atmosphere.

3. The method of claim 1, which further comprises the step of:

evacuating the oscillation space of the acceleration sensor prior to said sealing step.

4. The method of claim 2, which further comprises the step of:

evacuating the oscillation space of the acceleration sensor prior to said sealing step.

\* \* \* \* \*